United States Patent Office 3,441,561
Patented Apr. 29, 1969

3,441,561
AMIDES OF PYRAN DERIVATIVES AND ACRYLIC OR SUBSTITUTED ACRYLIC ACID
Edward George Gazzard and James Nairn Greenshields, Manchester, England, assignors to Imperial Chemical Industries Limited, London, England, a corporation of Great Britain
No Drawing. Filed July 19, 1965, Ser. No. 473,168
Claims priority, application Great Britain, Aug. 5, 1964, 31,817/64
Int. Cl. C07d 7/10; C08f 7/12, 19/00
U.S. Cl. 260—240                              11 Claims

ABSTRACT OF THE DISCLOSURE

A polymerisable monomer of the formula

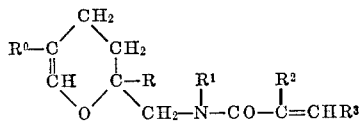

wherein $R^0$ and R represent hydrogen, a hydrocarbon radical or a halogen atom, R' represent hydrogen, a hydrocarbon radical or a group $R^4 \cdot CO$ where $R^4$ represents hydrogen or a hydrocarbon radical, $R^2$ represents hydrogen, a hydrocarbon radical, a halogen atom or a cyano group and $R^3$ represents hydrogen, a hydrocarbon radical or alkoxy radical.

---

This invention relates to novel polymerisable monomers to a process for the manufacture of such monomers and to polymers and copolymers derived from the said polymerisable monomers.

According to the present invention there are provided novel polymerisable monomers of the general Formula I.

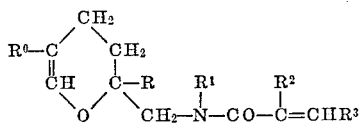  (I)

wherein $R^0$ and R represent hydrogen, a hydrocarbon radical or a halogen atom, $R^1$ represents hydrogen, a hydrocarbon radical or a group $R^4 \cdot CO$ where $R^4$ represents hydrogen or a hydrocarbon radical, $R^2$ represents hydrogen, a hydrocarbon radical, a halogen atom or a cyano group and $R^3$ represents hydrogen, a hydrocarbon radical or alkoxy radical.

The term hydrocarbon radical includes alkyl, cycloalkyl, aralkyl, aryl and alkaryl radicals.

The symbols $R^0$, R, $R^1$, $R^2$ and $R^3$ in the above general formula may be all the same or may be different in the same molecule.

Examples of radicals represented by $R^0$ and R which may be the same or different include hydrogen, methyl, ethyl, propyl, isopentyl, octyl, phenyl and chlorine.

Examples of radicals which may be represented by $R^1$ include hydrogen, methyl, ethyl, n-propyl, isopropyl, n-butyl, sec. butyl, tert. butyl, isobutyl, pentyl, hexyl, dodecyl, cetyl, cyclohexyl, benzyl and phenyl and when $R^1=R^4CO$, $R^4$ may be for example hydrogen, methyl, ethyl, propyl, phenyl, benzyl and p-toluyl.

Examples of radicals which may be represented by $R^2$ include hydrogen, methyl, chlorine and cyano.

Examples of radicals which may be represnted by $R^3$ include hydrogen, methyl, phenyl and alkoxy.

Particularly valuable polymerisable monomers are those compounds of the general formula above wherein $R^0$ and R represent hydrogen or lower alkyl radicals with from 1 to 4 carbon atoms, $R^2$ represents hydrogen or methyl, $R^1$ represents hydrogen, lower alkyl with from 1 to 4 carbon atoms, phenyl, benzyl, cyclohexyl, acetyl or benzoyl and $R^3$ represents hydrogen; especially those wherein $R^0$ and R represent hydrogen, $R^2$ represents hydrogen or methyl, $R^1$ represents hydrogen and $R^3$ represents hydrogen.

The polymerisable monomers of the present invention are substituted amides of acrylic acid or substituted acrylic acids. Thus when $R^0$, R, $R^1$, $R^2$ and $R^3$ in the above general formula all represent hydrogen the polymerisable monomer is N - (3,4-dihydro-2H-pyran-2-methyl)acrylamide and when $R^0$, R and $R^3$ represent hydrogen and $R^1$ and $R^2$ methyl radicals the polymerisable monomer is N - methyl - N - (3,4 - dihydro - 2H-pyran-2-methyl)-methacrylamide.

Other examples of the polymerisable monomers of the present invention include N-(2,5-dimethyl-3,4-dihydro-2H-pyran-2-methyl)acrylamide, N-(2,5-dimethyl-3,4-dihydro-2H - pyran-2-methyl)methacrylamide, N-methyl-N-(2,5-dimethyl - 3,4 - dihydro-2H-pyran-2-methyl)acrylamide, N - methyl - N - (2,5 - dimethyl-3,4-dihydro-2H-pyran-2-methyl)methacrylamide, N-phenyl-N-(3,4-dihydro-2H-pyran - 2-methyl)acrylamide, N-phenyl-N-(3,4-dihydro-2H - pyran-2-methyl)methacrylamide, N - phenyl-(2,5-dimethyl - 3,4 - dihydro-2H-pyran-2-methyl)acrylamide, N - phenyl - (2,5 - dimethyl - 3,4 - dihydro-2H-pyran-2-methyl)methacrylamide, N - acetoxy-N-(3,4-dihydro-2H-pyran-2-methyl)acrylamide, N-(3,4-dihydro-2H-pyran-2-methyl)α-chloroacrylamide, N - (3,4-dihydro-2H-pyran-2-methyl)crotonamide, N-(3,4-dihydro-2H-pyran-2-methyl) cinnamamide, N - methyl - N-(3,4-dihydro-2H-pyran-2-methyl)crotonamide, N - (2,5-dichloro-3,4-dihydro-2H-pyran - 2 - methyl)acrylamide and N-(3,4-dihydro-2H-pyran-2-methyl)α-cyanoacrylamide.

The polymerisable monomers of the present invention may be manufactured by reacting a 2-aminomethyl-3,4-dihydro-2H-pyran or an N-mono substituted derivative thereof with an ester or acid halide of acrylic acid or a substituted acrylic acid.

Thus as a further feature of the present invention there is provided a process for the manufacture of polymerisable monomers of the general formula:

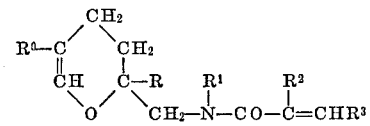

wherein $R^0$, R, $R^1$, $R^2$ and $R^3$ are as hereinbefore defined which comprises reacting a pyran derivative of the general formula:

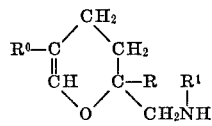

wherein $R^0$, R and $R^1$ are as hereinbefore defined with an ester or acid halide of acrylic acid or a substituted acrylic acid.

Examples of pyran derivatives of the general formula given above which may be used as starting materials in the process of this invention include:

2-aminomethyl-3,4-dihydro-2H-pyran,
2-aminomethyl-2,5-dimethyl-3,4-dihydro-2H-pyran,
2-aminomethyl-2,5-diethyl-3,4-dihydro-2H-pyran,
2-N-methylaminomethyl-3,4-dihydro-2H-pyran,
2-N-phenylaminomethyl-3,4-dihydro-2H-pyran,
2-N-cyclohexylaminomethyl-3,4-dihydro-2H-pyran,
2-N-benzylaminomethyl-3,4-dihydro-2H-pyran,
2-N-acetylaminomethyl-3,4-dihydro-2H-pyran,
2-N-benzoyl-aminomethyl-3,4-dihydro-2H-pyran, and
2-aminomethyl-2,5-dichloro-3,4-dihydro-2H-pyran.

The ester or acid halide of acrylic acid or a substituted acrylic acid used in the present process may be any such esters or acid halide.

Examples of such acids whose esters or acid halides may be used include acrylic acid, methacrylic acid, crotonic acid, α-chloroacrylic acid and α-cyanoacrylic acid, β-ethoxyacrylic acid and cinnamic acid.

Any suitable ester may be used, examples include the methyl, ethyl, 2-ethyl hexyl, propyl, butyl and octyl esters. The methyl and ethyl esters are preferred.

Any suitable acid halide may be used, the acid chloride is normally used.

The pyran derivative of general formula:

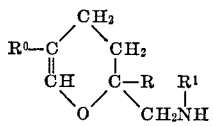

may be reacted with the required ester of an unsaturated acid, either alone or in the presence of an inactive solvent, preferably in the presence of a basic catalyst such as sodium methoxide, sodium ethoxide, sodium hydroxide, patassium methoxide or potassium ethoxide, with concomitant removal by distillation, of the formed alcohol. A polymerisation inhibitor such as hydroquinone or 2,4-di-tert.butyl phenol may also be included.

The reaction of the above pyran derivative with the required acid halide is carried out in the presence of an acid binding agent. This can be performed with or without a non-reactive solvent such as benzene, toluene, xylene, carbon tetrachloride, petroleum ether or kerosene, in the presence of pyridine, piperidine or suspended basic materials such as sodium carbonate, sodium bicarbonate, calcium oxide, calcium hydroxide, calcium carbonate, barium hydroxide, barium carbonate or an anion exchange resin as the acid binding agent.

The polymerisable monomers of the present invention are valuable materials for the production of new polymers and polymeric materials, especially by virtue of the fact that they contain two polymerisable groups of different natures.

The polymerisable monomers of the present invention may be homopolymerised by polymerisation of the vinyl double bond, to give useful polymeric materials.

Thus as a further feature of the present invention there are provided homopolymers of the polymerisable monomers of the general Formula I.

Homopolymers may be produced by treating the polymerisable monomers with radical initiators, for example free radical catalysts such as peroxides.

Examples of suitable catalysts include benzoyl peroxide cumene hydroperoxide, lauryl peroxide, bis(p-chlorobenzoyl peroxide) α,α'-azobis(isobutyronitrile), α,α'-azobis(α,γ-dimethyl-γ-methoxyvaleronitrile) and α,α'-azobis(α,γ,γ-trimethylvaleronitrile).

The polymerisable monomers of the present invention can also be copolymerised with other vinyl monomers such as acrylates, using similar polymerisation catalysts to give copolymers.

Examples of suitable vinyl monomers useful for the manufacture of such copolymers include methyl acrylate, methylmethacrylate, ethyl acrylate, butyl acrylate, 2-ethylhexylacrylate, octyl acrylate, β-ethoxyethylmethacrylate, vinyl chloride, vinylidene chloride, acrylenitrile, sytrene, vinyl toluene, acrylamide, methacrylamide, acrylic acid and methacrylic acid.

Homopolymerisation and copolymerisation may be carried out by the methods and under condiitons normally used for vinyl polymerisation.

Homopolymers and copolymers of the polymerisable monomers of the present invention may be further cross-linked by the use of acid catalysts or Friedel Crafts catalysts.

Cross-linking of the homopolymers or copolymers may be carried out in the presence of cross-linking agents reactive with vinyl ether groups. Suitable cross-linking agents which may be incorporated include polyhydric alcohols, polyhydric phenols, polycarboxylic acids, polyamines and other compounds containing two or more active hydrogen atoms. Urea or melamine/formaldehyde resins and polyepoxides may also be used.

Specific examples of suitable cross-linking agents include, ethylene glycol, propylene glycol, diethylene glycol, polyethylene glycol, trimethylol propane, glycerol, pentaerythritol, polypropylene glycol, 2,2-bis(4'-hydroxyphenyl)propane, hydroquinone, succinic acid, adipic acid, phenylenediamine, ethylenediamine, hexamethylenediamine, toluenediamine, ethanolamine, diethanolamine, triethanolamine, methylol methoxymethyl melamines, 2,2-bis(4'-hydroxyphenyl)propane diglycidyl ether. Polyesters containing —OH and —COOH groups, polyamides, polyesteramides, ethyl cellulose and partially hydrolysed polyvinyl acetate may be used.

A further class of homopolymers may be produced by polymerising the polymerisable monomers of the present invention in the presence of catalysts known to polymerise vinyl ether groups, such catalysts may be acidic or nonacidic and include Friedel Crafts catalysts. Homopolymers of this type are formed by polymerisation of the vinyl ether group present in the dihydropyran ring structure.

Similarly a further class of copolymers may be prepared by copolymerisation of the polymerisable monomers of the present invention with other suitable monomers, such as methyl vinyl ether, ethylvinyl ether, butylvinyl ether or any other vinyl ether, styrene, α-methylstyrene, indene coumarone, β-pinene, dipentene, isobutene or maleic anhydride.

Examples of suitable catalysts for the preparation of homopolymers and copolymers of this type include strong proton-donating acids such as hydrochloric acid, p-toluene sulphonie acid and Lewis acids such as trimethoxyboroxine and boron trifluoride conveniently employed as the etherate, $BF_3(C_2H_5)_2O$. Other suitable acid catalysts include ferric chloride, stannic chloride, phosphorus pentachloride, phosphoric acid, perchloric acid, acetic acid, trifluoroacetic acid, fluoboric acid, boron trifluoride dihydrate, hydrogen fluoride, antimony pentafluoride, hexafluorophosphoric acid, lead fluoborate, antimony fluoroborate, sulphuric acid and silicotungstic acid, and nonacid catalysts such as iodine and iodine containing compounds such as iodine chloride, iodine bromide, iodine perchlorate, iodine acetate, iodine triphosphate and iodine triacetate and triphenyl methyl derivatives of anions having a low ester forming tendency, for example triphenylmethyl perchlorate, hexachloroantimonate, chloromercurate, chlorzincate and chloroaluminate.

Homopolymers and copolymers produced by the above catalysts may be further cross-linked or copolymersed by radical initiated polymerisation or reaction of the vinyl grouping:

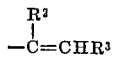

present in such homopolymers.

Homopolymers and copolymers produced from the polymerisable monomers of the present invention are useful as surface coatings, textile finishes and in non-woven textile materials. There may be incorporated in the manufacture of such polymers, agents such as are normally incorporated in the manufacture of polymeric materials, for example, plasticisers, pigments, colouring materials and fire retardants.

EXAMPLE 1

Preparation of N-(3,4-dihydro-2H-pyran-2-methyl)acrylamide

Acrylyl chloride (9.9 parts) is dissolved in 20 parts of carbon tetrachloride and added over a period of 15 minutes to a stirred mixture of 11.3 parts of 2-aminomethyl-3,4-dihydro-2H-pyran and 16.8 parts of sodium bicarbonate in 30 parts of carbon tetrachloride. The temperature of the reaction mixture is maintained below 44° C. with the aid of an ice bath. After addition is completed the ice bath is removed and the reaction mixture maintained at 40–45° C. for a further 30 minutes with continued stirring. After removal of the solid by filtration the solution is distilled through a claisen head yielding initially the carbon tetrachloride and any excess acrylyl chloride followed by a fraction of 12.0 parts boiling from 108 to 110° C. at 0.15 mm., $n_d^{25}=1.5126$. This latter fraction crystallises on cooling giving a white solid (M.P. 34–37° C.). Carbon, hydrogen and nitrogen analysis and the Infra-red and Nuclear Magnetic Resonance spectra are consistent with this material being N-(3,4-dihydro-2H-pyran-2-methyl)acrylamide.

Polymerisation.—The N-(3,4-dihydro-2H-pyran-2-methyl)acrylamide on standing in presence of air and a trace of acid catalyst homopolymerises to a hard, glass-like resin.

EXAMPLE 2

Preparation N-(3,4-dihydro-2H-pyran-2-methyl)-methacrylamide 20 parts by weight of methylmethacrylate, 22.6 parts by weight of 2-aminomethyl-3,4-dihydro-2H-pyran, 0.2 part by weight of hydroquinone, and 1.6 parts by weight of a 10% methanolic solution of sodium methoxide are heated at 110° C. for 5 hours. The reaction product is distilled in an atmosphere of nitrogen, under reduced pressure. The fraction boiling at 102–104° C./0.1 mm. Hg. is collected, in amount 17 parts by weight. The product solidifies on cooling and after crystallisation from methanol/water melts as 75.8° C.

EXAMPLE 3

Copolymer from butylacrylate and N-(3,4-dihydro-2H-pyran-2-methyl)acrcylamide (10:1 molar)

1.9 parts of N-(3,4-dihydro-2H-pyran-2-methyl)acrylamide, 16.6 parts of butyl acrylate, 0.47 part benzoyl peroxide and 16.5 parts by volume of xylene are heated under slight reflux (140–145° C.) for 2 hours. A viscous pale yellow solution of the copolymer is produced. A soft gel is produced within 30 minutes when 0.1 part of 5% BF₃ in ether is added to 2.5 part of this solution and also when 0.25 part of 2% p-toluene sulphonic acid is added to 2.5 part of the solution.

EXAMPLE 4

Preparation of methylmethacrylate/2-ethylhexylacrylate/N-(3,4-dihydro-2H-pyran-2-methyl)acrylamide 64/25/11 copolymer To a one litre flask fitted with a thermometer, stirrer, reflux condenser, Dean and Stark separator, dropping funnel and nitrogen inlet is added 123.5 parts by weight of xylene and 120.5 parts by weight of butanol. The system is purged with nitrogen and under an atmosphere of nitrogen the solvent mixture is heated by external heating, with stirring, to a reflux temperature of 115–116° C.

At this temperature there is added, uniformly and continuously, over 2 hours, a mixture of 168 parts by weight of methyl methacrylate, 65.7 parts by weight of 2-ethylhexylacrylate, 28.8 parts by weight of N-(3,4-dihydro-2H-pyran-2-methyl) acrylamide, 1.3 parts by weight of benzoyl peroxide, and 1.3 parts by weight of cumene hydroperoxide. Maintaining the temperature for reflux the reaction mixture is heated, for a further 4 hours.

Yield.—508 parts by weight of a clear colourless solution of viscosity (bubble tube) 17 poises and solids content (dried 4 hours at 130° C.) 51.3%. The dried product is an almost colourless, hard and solvent soluble film.

Preparation of pigmented coatings from the above copolymer.—48 parts by weight of above copolymer solution, 12 parts by weight of Rutiox HD (white pigment). 12 parts by weight of a 4 parts by weight xylene, 1 part by weight butanol solution, and 150 parts by weight of porcelain balls are milled for 18 hours. The milled suspension is passed through a gauze filter.

The following mixtures are flow coated on tin plate and baked at 130° C. for 30 minutes:

(a) the pigmented suspension alone
(b) 5 parts by weight of pigmented suspension and 0.17 part by weight of a 10% solution of boron trifluoride in polypropylene glycol of molecular weight 425
(c) 5 parts by weight of pigmented suspension and 0.17 part by weight of a 20% solution of p-toluene sulphonic acid in xylene/butanol
(d) 5 parts by weight of pigmented suspension, 0.17 part by weight of a 20% solution of p-toluene sulphonic acid, and 0.14 part by weight of ethylene glycol
(e) 5 parts by weight of pigmented suspension, 0.17 part by weight of a 20% solution of p-toluene sulphonic acid, and 2.3 parts by weight of a 16% solution of adipic acid
(f) 5 parts by weight of pigmented suspension, 0.17 part by weight of a 50% solution of hexamethoxymethyl melamine in toluene, and 0.17 part by weight of a 20% solution of p-toluene sulphonic acid
(g) 5 parts by weight of pigmented suspension, 0.42 part by weight of a 50% solution of hexamethoxymethyl melamine, and 0.17 part by weight of a 20% solution of p-toluene sulphonic acid
(h) 5 parts by weight of pigmented suspension, 0.17 part by weight of diphenylolpropane diglycide ether, and 0.17 part by weight of a 20% solution of p-toluene sulphonic acid
(i) 5 parts by weight of pigmented suspension, 0.17 part by weight of diphenylolpropane diglycide ether, and 0.034 part by weight of dimethyllaurylamine The baked coatings range from hard solvent soluble rigid films to hard solvent resistant flexible films, resistant to alkali.

EXAMPLE 5

Preparation of β-ethoxy-N-(3,4-dihydro-2H-pyran-2-methyl)acrylamide 17 parts 2-aminomethyl-3,4-dihydro-2H-pyran, 25.2 parts sodium bicarbonate and 88 parts dry benzene are stirred and are cooled to 5° C. There is added, continuously over 50 minutes, 20.1 parts β-ethoxyacrylyl chloride controlling the temperature at 5° C. or less by external cooling. The mixture is warmed slowly to 50° C. and is stirred at this temperature for 1 hour. The cooled reaction mixture is filtered and the drained filter cake is washed with 17.6 parts dry benzene. The combined benzene filtrates are washed with aqueous sodium hydroxide solution, washed alkali free with water and dried over anhydrous potassium carbonate. The solution is filtered and benzene is removed by distillation on a steam bath under reduced pressure to give 13.5 parts residue. This residue is recrystallised from ethanol to give 7 parts β-ethoxy-N-(3,4-dihydro-2H-pyran-2-methyl)acrylamide as a white solid, M.P. 97° C.

EXAMPLE 6

Preparation of N-(3,4-dihydro-2H-pyran-2-methyl)cinnamamide 32.4 parts methyl cinnamate is stirred at 40° C. and there is added continuously over 30 minutes, 22.6 parts 2-aminomethyl-3,4-dihydro-2H-pyran. A solution of 0.27 part sodium dissolved in 3.2 parts methanol is then added and the reaction mixture is heated to 100–102° C. Heating is continued at this temperature for 5 hours. The cooled reaction product is dissolved in 83 parts ether and the solution is washed with aqueous sodium hydroxide solution and then washed alkali free with water. The ether solution is dried over anhydrous potassium carbonate and filtered. The ether is removed under slight vacuum and the residual liquor is filtered to give 7 parts of white crystalline solid. The solid is recrystallised from methanol to give 3 parts N - (3,4 - dihydro - 2H - pyran - 2 - methyl)cinnamamide, M.P. 95° C.

EXAMPLE 7

Copolymerisation of the cinnamamide of Example 6 with methylmethacrylate 5 parts xylene, 3.75 parts methylmethacrylate, 1.25 parts N - (3,4 - dihydro - 2H - pyran - 2 - methyl)cinnamamide, 0.025 part benzoyl peroxide and 0.025 part cumene hydroperoxide are heated to reflux under a nitrogen atmosphere. Heating at this temperature is continued for 4 hours. The reaction mixture is cooled to give a slightly yellow solution of the copolymer of solids content 45.5% and viscosity 1.5 poises.

EXAMPLE 8

Preparation of N-n.butyl-N-(3,4-dihydro-2H-pyran-2-methyl)acrylamide 23 parts 2-n-butylaminomethyl-3,4-dihydro-2H-pyran, 17.2 parts sodium bicarbonate and 88 parts dry benzene are stirred at 10° C. There is added, continuously over 20 minutes, a solution of 11.9 parts acrylylchloride dissolved in 12 parts dry benzene and the temperature is maintained at less than 10° C. by external cooling. The reaction mixture is allowed to warm to room temperature and is allowed to stand for 10 days. The reaction mixture is filtered and the filtrate washed with aqueous sodium hydroxide solution and then washed alkali free with water. The washed solution is dried over anhydrous potassium carbonate and is filtered. 0.5 part hydroquinone is added and the benzene is removed by distillation under reduced pressure. Further distillation of the residue gives 15.5 parts of a fraction B.P. 126–128° C./0.5 mm. Hg, $n_d^{25}$ 1.4932 essentially N-n.butyl - N - (3,4 - dihydro - 2H - pyran - 2- methyl)acrylamide.

EXAMPLE 9

Preparation of N-(2,5-dimethyl-3,4-dihydro-2H-pyran-2-methyl)acrylamide 28.2 parts 2-aminomethyl-2,5-dimethyl-3,4-dihydro-2H-pyran, 33.6 parts sodium bicarbonate and 88 parts dry benzene are stirred at 10° C. there is then added, continuously over 1 hour, a solution of 19.9 parts acrylyl chloride dissolved in 22 parts benzene with the temperature of the reaction mixture controlled at 10° C. or less by external cooling. The reaction mixture is allowed to warm to room temperature and there is added 0.5 part hydroquinone. The mixture is heated to 50° C. and is held at this temperature for one hour. The mixture is cooled and is filtered. The drained filter cake is washed with 88 parts dry benzene. The combined benzene filtrates and washings are washed with aqueous sodium hydroxide solution, are finally washed alkali free with water and are dried over anhydrous potassium carbonate. To the filtered solution is added 0.2 part hydroquinone and the mixture is distilled under reduced pressure to give 30 parts N-(2,5-dimethyl - 3,4 - dihydro - 2H - pyran - 2 - methyl)acrylamide, B.P. 127–128° C./0.3 mm. Hg, $n_d^{25}$ 1.5052.

EXAMPLE 10

Copolymerisation of the acrylamide of Example 9 with methyl methacrylate 100 parts xylene is heated to reflux, with stirring, under an atmosphere of nitrogen and there is added, continuously over 2 hours, a mixture of 95 parts methylmethacrylate, 5 parts N-(2,5-dimethyl-3,4-dihydro-2H-pyran-2-methyl)-acrylamide, 0.5 part benzoyl peroxide and 0.5 part cumene hydroperoxide. The mixture is heated at reflux for a further four hours and is allowed to cool to give a clear slightly yellow solution of the copolymer of solids content ca. 50.3% and viscosity 50 poises.

EXAMPLE 11

Preparation of N-(3,4-dihydro-2H-pyran-2-methyl)crotonamide

A solution of 45.2 parts 2-aminomethyl-3,4-dihydro-2H-pyran in 196 parts pyridine is stirred and is cooled to 10° C. There is then added, continuously over 1 hour, a solution of 46 parts crotonyl chloride dissolved in 44 parts benzene and the temperature of the reaction mixture is maintained at 10° C. or less by external cooling. The reaction mixture is warmed to 50° C. is held at this temperature for 1 hour and is allowed to cool. The upper benzene rich layer is separated, is washed with aqueous sodium hydroxide solution, is washed alkali free with water and is dried over anhydrous potassium carbonate. The filtered solution is distilled under vacuum to remove solvent and gives 11 parts colourless liquid, B.P. 141–145° C./0.5 mm Hg, which crystallises to a solid of M.P. 76° C. which analyses for N-(3,4-dihydro-2H-pyran-2-methyl)crotonamide.

EXAMPLE 12

Copolymerisation of methyl methacrylate with the crotonamide of Example 11

A solution of 95 parts methylmethacrylate, 5 parts N-(3,4-dihydro-2H-pyran-2-methyl)crotonamide, 0.5 part benzoyl peroxide and 0.5 part cumene hydroperoxide is added continuously over 2 hours to 100 parts xylene heated to reflux with stirring, under an atmosphere of nitrogen. The mixture is heated at reflux for a further 4 hours and is cooled to give a clear, slightly yellow solution of the copolymer of viscosity 50 poises and solids content of ca. 48.3%.

EXAMPLE 13

Preparation of copolymer of ethyl vinyl ether and N-(3,4-dihydro-2H-pyran-2-methyl)cinnamamide A mixture of 159 parts carbon tetrachloride, 39 parts benzene, 9 parts ethyl vinyl ether and 1 part N-(3,4-dihydro-2H-pyran-2-methyl)cinnamamide is stirred at 10° C. and there is added 0.1 part of a 42% aqueous solution of hydrofluoroboric acid. After the initial exothermic rise the temperature of the reaction mixture is controlled at 22° C. and the mixture is stirred at this temperature for 12 hours. The mixture is treated with 0.2 part of concentrated aqueous ammonia, is filtered and is distilled to remove solvent and lower boiling materials. 3 parts of the obtained copolymer is dissolved in 6 parts of toluene. This solution coated on tin plate and baked at 140° C. for half an hour gives a soft tacky film. A coating, containing a catalytic amount of cumene hydroperoxide and baked at 140° C. for 6 hours gave a non-tacky, solvent resistant film of poor mar resistance. A similar coating containing small amounts of both cumene hydroperoxide and a cobalt naphthenate gave a mar resistant film insoluble in acetone.

EXAMPLE 14

Preparation of copolymer of ethyl vinyl ether and N-(3,4-dihydro-2H-pyran-2-methyl)acrylamide A mixture of 159 parts carbon tetrachloride, 9 parts ethyl vinyl ether and 1 part N-(3,4-dihydro-2H-pyran-2- methyl)acrylamide is stirred at −2° C. and there is added 0.1 part of a 42% aqueous solution of hydrofluoroboric acid. The exothermic temperature rise is controlled at 22° C. and the mixture is stirred at this temperature for 12 hours. The reaction mixture is treated with 0.2 part concentrated aqueous ammonia, is filtered, and is distilled to remove lower boiling materials. 3 parts of residue showing infra-red absorption expected from a copolymer obtained by way of vinyl ether polymerisation is dissolved in 6 parts of toluene. This solution when treated with catalyst, coated on tin plate and baked as in Example 13 gave similar films with similar properties.

EXAMPLE 15

Preparation of N-acetyl-N-(3,4-dihydro-2H-pyran-2-methyl)acrylamide a mixture of 15.5 parts N-acetyl-2-aminomethyl-3,4-dihydro-2H-pyran, 16.8 parts sodium bicarbonate and 145 parts chloroform is stirred at 2° C. and there is added, continuously over 15 minutes 9.05 parts acrylyl chloride. The mixture is allowed to warm slowly to room temperature and is then heated to 60° C. and stirred at this temperature for 10 hours. The mixture is cooled and filtered and the drained filter cake is washed with 29 parts chloroform. The combined filtrates and washings are washed with aqueous sodium hydroxide and then with water and dried over anhydrous potassium carbonate. The dried solvent solution is mixed with a small amount of hydroquinone and is distilled to give 7 parts of a liquid fraction, B.P. 107–118° C./0.15 mm. Hg. This fraction is essentially N-acetyl-N-(3,4-dihydro-2H-pyran-2-methyl)acrylamide containing a small amount of N-acetyl-2-aminomethyl-3,4-dihydro-2H-pyran. This material on heating alone or with a small amount of benzoyl peroxide sets to a hard polymeric mass.

What we claim is:

1. A polymerizable monomer of the formula

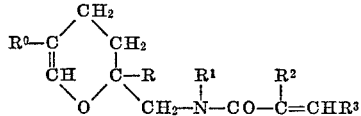

wherein $R^0$ and R each represent a member selected from the group consisting of hydrogen, lower alkyl and chlorine; R' represents a member selected from the group consisting of hydrogen, alkyl, cyclohexyl, benzyl, phenyl and $R^4CO$ wherein $R^4$ represents a member selected from the group consisting of hydrogen, lower alkyl and phenyl; $R^2$ represents a member selected from the group consisting of hydrogen, methyl, chlorine and cyano and $R^3$ represents a member selected from the group consisting of hydrogen, methyl, phenyl and ethoxy.

2. A polymerizable monomer as claimed in claim 1 wherein $R^0$ and R each represent a member selected from the group consisting of hydrogen and lower alkyl having 1–4 carbon atoms; $R^2$ represents a member selected from the group consisting of hydrogen and methyl; R' represents a member selected from the group consisting of hydrogen, lower alkyl having 1–4 carbon atoms, phenyl, benzyl, cyclohexyl, acetyl and benzoyl and $R^3$ is hydrogen.

3. A polymerizable monomer of the formula

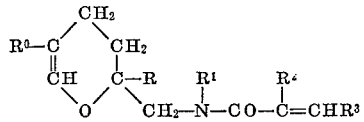

wherein $R^0$ and R each represent hydrogen, $R^2$ represents a member selected from the group consisting of hydrogen and methyl, $R^1$ is hydrogen and $R^3$ is hydrogen.

4. N-(3,4-dihydro-2H-pyran-2-methyl)acrylamide.

5. N-(3,4-dihydro-2H-pyran - 2 - methyl)methacrylamide.

6. β-Ethoxy-N-(3,4 - dihydro - 2H - pyran-2-methyl) acrylamide.

7. N-(3,4-dihydro-2H-pyran-2-methyl)cinnamamide.

8. N-n-butyl-N-(3,4-dihydro-2H-pyran - 2 - methyl) acrylamide.

9. N-(2,5-dimethyl-3,4-dihydro-2H-pyran - 2 - methyl) acrylamide.

10. N-(3,4-dihydro-2H-pyran-2-methyl)crotonamide.

11. N-acetyl-N-(3,4 - dihydro - 2H - pyran-2-methyl) acrylamide.

References Cited

UNITED STATES PATENTS 3,072,650  1/1963  Semb et al. _____ 260—240

JOHN D. RANDOLPH, *Primary Examiner.*

U.S. Cl. X.R.

117—132; 260—86.1, 88.3, 345.1, 345.7